United States Patent [19]

Roux

[11] Patent Number: 5,090,128
[45] Date of Patent: Feb. 25, 1992

[54] DEVICE FOR MEASURING OR CONTROLLING CHANGE OF LEVEL BETWEEN SEVERAL POINTS

[75] Inventor: Daniel Roux, Voreppe, France

[73] Assignee: Installation Europeenne de Rayonnement Synchrotron (European Synchrotron Radiation Facility), Grenoble, France

[21] Appl. No.: 631,849

[22] Filed: Dec. 21, 1990

[30] Foreign Application Priority Data

Dec. 21, 1989 [FR] France .................. 89 17003

[51] Int. Cl.⁵ .................... G01C 5/04; G01C 9/22
[52] U.S. Cl. ........................ 33/367; 33/366; 33/377; 340/618; 361/284
[58] Field of Search .............. 33/367, 366, 377; 73/718, DIG. 8; 340/618; 361/284

[56] References Cited

U.S. PATENT DOCUMENTS

| | | | |
|---|---|---|---|
| 2,804,692 | 9/1957 | Karstens | 33/367 |
| 2,864,981 | 12/1958 | Giers | 361/284 |
| 3,645,135 | 2/1972 | Hadley | 73/398 |
| 3,842,512 | 10/1974 | Stoltz et al. | 33/366 |
| 3,949,484 | 4/1976 | Cluley et al. | 33/367 |
| 4,026,156 | 5/1977 | Bowditch et al. | 33/367 |
| 4,379,367 | 4/1983 | Legris | 33/367 |
| 4,384,410 | 5/1983 | Melugin et al. | 33/367 |
| 4,581,931 | 4/1986 | Robotti et al. | 33/367 |
| 4,603,485 | 8/1986 | Ostby | 33/367 |
| 4,625,424 | 12/1986 | de la Haye | 33/367 |
| 4,651,433 | 3/1987 | Mohr | 33/367 |
| 4,943,889 | 7/1990 | Ohmatoi | 361/284 |

FOREIGN PATENT DOCUMENTS

| | | | |
|---|---|---|---|
| 0057481 | 8/1982 | European Pat. Off. | |
| 1051372 | 10/1983 | U.S.S.R. | 33/367 |
| 1059424 | 12/1983 | U.S.S.R. | 33/367 |
| 0239862 | 10/1986 | U.S.S.R. | 33/367 |
| 8903018 | 4/1989 | World Int. Prop. O. | 33/367 |

Primary Examiner—William A. Cuchlinski, Jr.
Assistant Examiner—Alvin Wirthlin
Attorney, Agent, or Firm—Armstrong, Nikaido, Marmelstein, Kubovcik & Murray

[57] ABSTRACT

A device measures or controls a change of a level or a variation in a change of a level between several points. The device includes closed vessels (2) placed respectively at each of the points. The vessels are partially filled with a liquid (53) and are connected by liquid pipes emerging in their lower portion so as to form a liquid circuit (31) and by gas pipes emerging in their upper portion so as to form a gas circuit (36). Each vessel is equipped with a capacitive proximity sensor (11) placed above and at a distance from the upper surface (54) of the liquid which it contains and which provides a signal with respect to position in the vertical direction of a zone of the upper surface of the liquid in the vessel. A device comprises the signals provided by the sensors so as to be able to provide data with respect to the vertical position of the vessels and, consequently, with respect to the points relative to one another or relative to a reference vertical position.

19 Claims, 3 Drawing Sheets

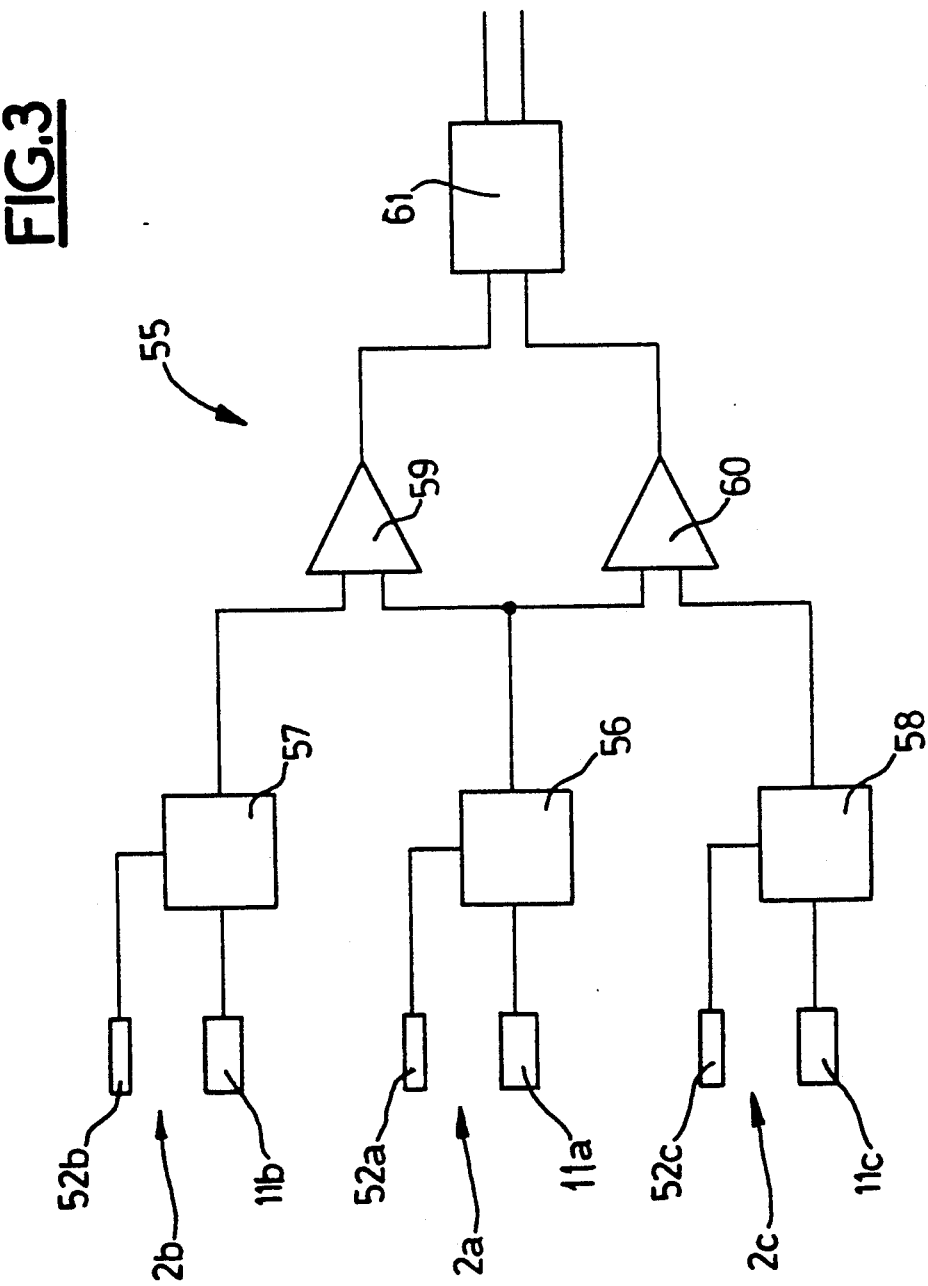

DEVICE FOR MEASURING OR CONTROLLING CHANGE OF LEVEL BETWEEN SEVERAL POINTS

FIELD OF THE INVENTION

The present invention relates to a device for measuring or controlling a change of a level or a variation in a change of a level between several points.

BACKGROUND OF THE INVENTION

There are many fields in which it is or becomes essential to precisely measure or control the change of level or the variation in a change of a level between several points which may possibly be located at relatively large distances from one another. In addition, it is and becomes important to be able to perform the above-mentioned measurements or controls continuously in order to be able possibly to perform intervention operations on the vertical position of the points.

SUMMARY OF THE INVENTION

The present invention thus aims to provide a device which makes it possible to measure or control the change of a level or the variation in change of a level between several points chosen, for example, with a view to their satisfactory operation or with a view to preventing accidents, on the constituent elements particularly of nuclear accelerators, nuclear power plants, reactor foundations, cooling tower foundations, hydraulic barrages or all other types of civil engineering works, such as bridges, acceleration ramps or guide rails, beds or frames of machine tools, or chosen at different locations on the ground in order to be able to monitor particularly the movements of the Earth's plates.

In order to achieve the abovementioned objectives, the device of the invention comprises closed vessels placed respectively at each of the points. The vessels are partially filled with a liquid and are connected by liquid pipes emerging in their lower portion so as to form a liquid circuit and by gas pipes emerging in their upper portion, so as to form a gas circuit. Each vessel is equipped with a capacitive proximity sensor which has at least two electrodes which are spaced horizontally and whose lower face is placed above and at a distance from the upper surface of the liquid which it contains and which is to provide a signal with respect to position in the vertical direction of a zone of this upper surface of the liquid in this vessel. It also comprises a device for comparing the signals provided by the sensors so as to be able to provide data with respect to the vertical position of the said vessels and, consequently, with respect to the points relative to one another or relative to a reference vertical position.

According to the invention, the gas circuit may be connected to a source of gas at constant pressure.

The abovementioned gas could advantageously be air, the air circuit thus formed being, for example, connected to the atmosphere.

According to the invention, the device preferably comprises an auxiliary vessel inserted in the liquid circuit and in the gas circuit, this auxiliary vessel being adapted for filling the liquid circuit.

The device preferably comprises a pump which makes it possible to cause the liquid to circulate in the liquid circuit, which may also be equipped with a closure valve, the pump preferably being mounted in bypass mode relative to this valve.

According to the invention, the body of the said vessel preferably has a thick wall.

Each vessel may advantageously be equipped with a temperature probe which makes it possible to measure the temperature of the liquid, it being possible for this probe, for example, to be inserted in the body of the vessel and extended at a short distance from the liquid.

According to a particular choice, the liquid filling the abovementioned liquid circuit is water preferably containing an antibacterial substance, such as bleach.

In a preferred alternative embodiment of the invention, the capacitive sensor comprises a central electrode with a vertical axis surrounded at a distance by an annular protective horn, an annular electrical insulator placed between these electrodes and connected to the latter in a leaktight manner together with an annular electrical insulator extending around the annular protective horn and connected in a leaktight manner to the latter and to the body of the vessel, the lower radial face of the electrodes and of the insulators, which faces the surface of the liquid, being in the same horizontal plane.

The electrodes are preferably made from an alloy of iron and nickel with 42 % nickel and the said electrical insulators are made from glass.

The lower face of the capacitive sensor is preferably covered with a corrosion-resistant layer.

Similarly, the inner wall of the vessel may be covered with a corrosion-resistant layer.

These covering layers are preferably made from tin-zinc.

In an alternative embodiment, the capacitive sensor is carried by a removable upper portion of the vessel.

According to the invention the device preferably comprises a device which makes it possible to heat the elements forming the capacitive sensor.

DESCRIPTION OF THE DRAWINGS

The present invention will be better understood by studying a device for measuring or controlling a change of a level or a variation in a change of a level between several points, which is described by way of a non-limiting example and is illustrated in the drawing, in which.

DESCRIPTION OF THE PREFERRED EMBODIMENTS

Figure 1:
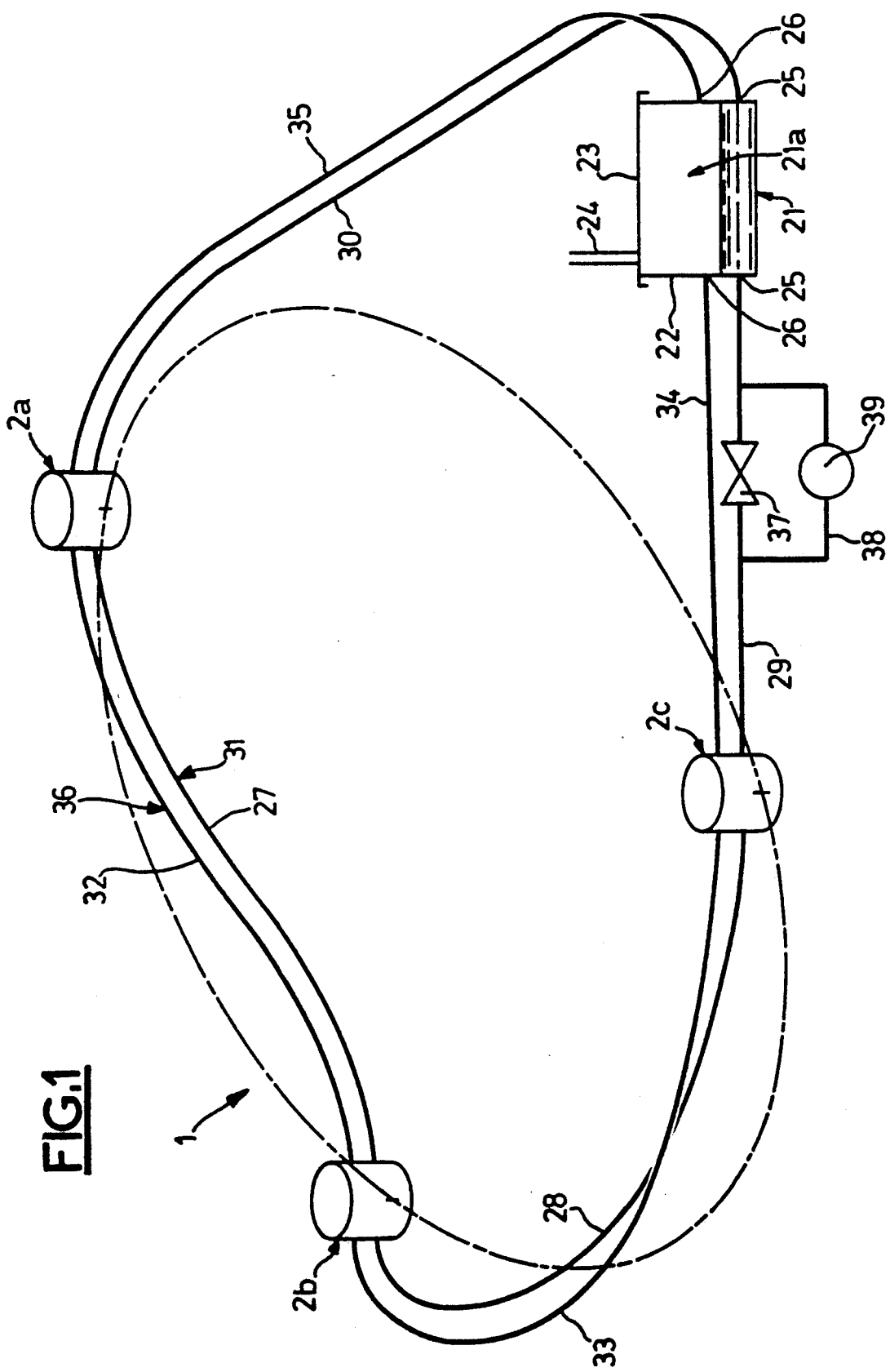
FIG. 1 shows a perspective view of a device according to the invention comprising three vessels.

The device for measuring or controlling a change of a level or a variation in a change of a level shown in FIG. 1 and indicated generally by the reference 1 is, for example, to the control of a subsidence of the magnetic elements of a synchrotron radiation accelerator in which it is appropriate to monitor any vertical displacement within a very small range, possibly between 0 and 100 microns in order to act on the jacks for adjusting the magnetic elements and to minimize the influence of ground subsidence on the orbit of the particle beam.

Although it may comprise many more vessels, the device 1, shown in FIG. 1, comprises three of these vessels 2a, 2b and 2c, which are fixed at three specific points normally located in the same horizontal plane and of which it is desired to know the possible variations in position in the vertical direction.

To use the above example of application, the various vessels 2a, 2b and 2c, and possibly other vessels, may be respectively fixed on the structure of the various above-mentioned magnetic elements The vessels 2a, 2b and 2c of the device 1, shown in FIG. 1, are identical to the vessel shown in FIG. 2 and indicated generally by the reference 2, whose structure is as follows.

The vessel 2 comprises a hermetically closed body 3 which comprises a horizontal base plate 4, a cylindrical wall 5 with a vertical axis, the lower portion of which is fixed in a leaktight manner to the base 4, and a removable upper portion indicated generally by the reference 6 which comprises a sensor support 7 and a cover 8.

The support 7 comprises an annular collar 9 bearing on the upper edge of the cylindrical portion 5 and a cylindrical portion 10 which extends downwards from the collar 9 inside the cylindrical portion 5 and at a distance from its inner cylindrical wall, coaxially with the latter.

A capacitive proximity sensor indicated generally by the reference 11 is mounted inside the lower portion of the cylindrical portion 10 of the support 7. The lower face 12 of this capacitive sensor 11, which will be described below, and the annular end 13 of the cylindrical portion 10 extend in the same horizontal plane, at a distance from the base 14 of the chamber 15 thus defined in the body 3.

The cover 8 comprises an annular collar 16 which is placed so as to bear on the collar 9 and a cylindrical portion 17 which extends upwards.

The collars 9 and 16 have passing through them a multiplicity of screws 18 which are screwed into the upper portion of the cylindrical wall 5 of the body 3 so as to form a leaktight join between the latter.

The body 3 is equipped with two opposite exterior tubes 19 which are fixed in a leaktight manner on the lower portion of the cylindrical wall 5 and which communicate with the lower portion of the chamber 15, below the lower face 12 of the capacitive sensor 11. One of these tubes is radially extending while the other extends outwards and downwards.

The body 3 is also equipped with two opposite external tubes 20 which are fixed to the upper portion of the cylindrical wall 5 and which extend radially, these tubes communicating with the upper portion of the chamber 15, opposite the peripheral wall of the cylindrical portion 10 of the support 7.

Referring to FIG. 1, it is seen that the device 1 also comprises an auxiliary vessel 21 whose lower face is substantially at the same level as the lower face of the vessels 2a, 2b and 2c. This vessel 21 comprises a body 22 in the form of a dish covered by a cover 23 equipped with an atmosphere vent tube 24 extending upwards. This auxiliary vessel 24 is also equipped, in its lower portion, with opposite external tubes 25 and, in its upper portion, with opposite external tubes 26.

The lower tubes 19 of the vessels 2a, 2b and 2c and the lower tubes 25 of the auxiliary vessel 21 are respectively connected via pipes 27, 28, 29 and 30 so as to form a closed circuit 31 in which the inner chambers 15 of the vessels 2a, 2b and 2c and the chamber 21a of the auxiliary vessel 21 are in communication, these pipes extending substantially horizontally.

Similarly, the upper tubes 20 of the vessels 2a, 2b and 2c and the upper tubes 26 of the auxiliary vessel 21 are connected via pipes 32, 33, 34 and 35 so as to form a closed circuit 36 in which the inner chambers 15 of the vessels 2a, 2b and 2c and the inner chamber 21a of the auxiliary vessel 21 are in communication.

A closure valve 37 is provided on the pipe 29. A pipe 38, on which a circulation pump 39 is provided, is mounted in by-pass mode relative to this closure valve 37.

Figure 2:
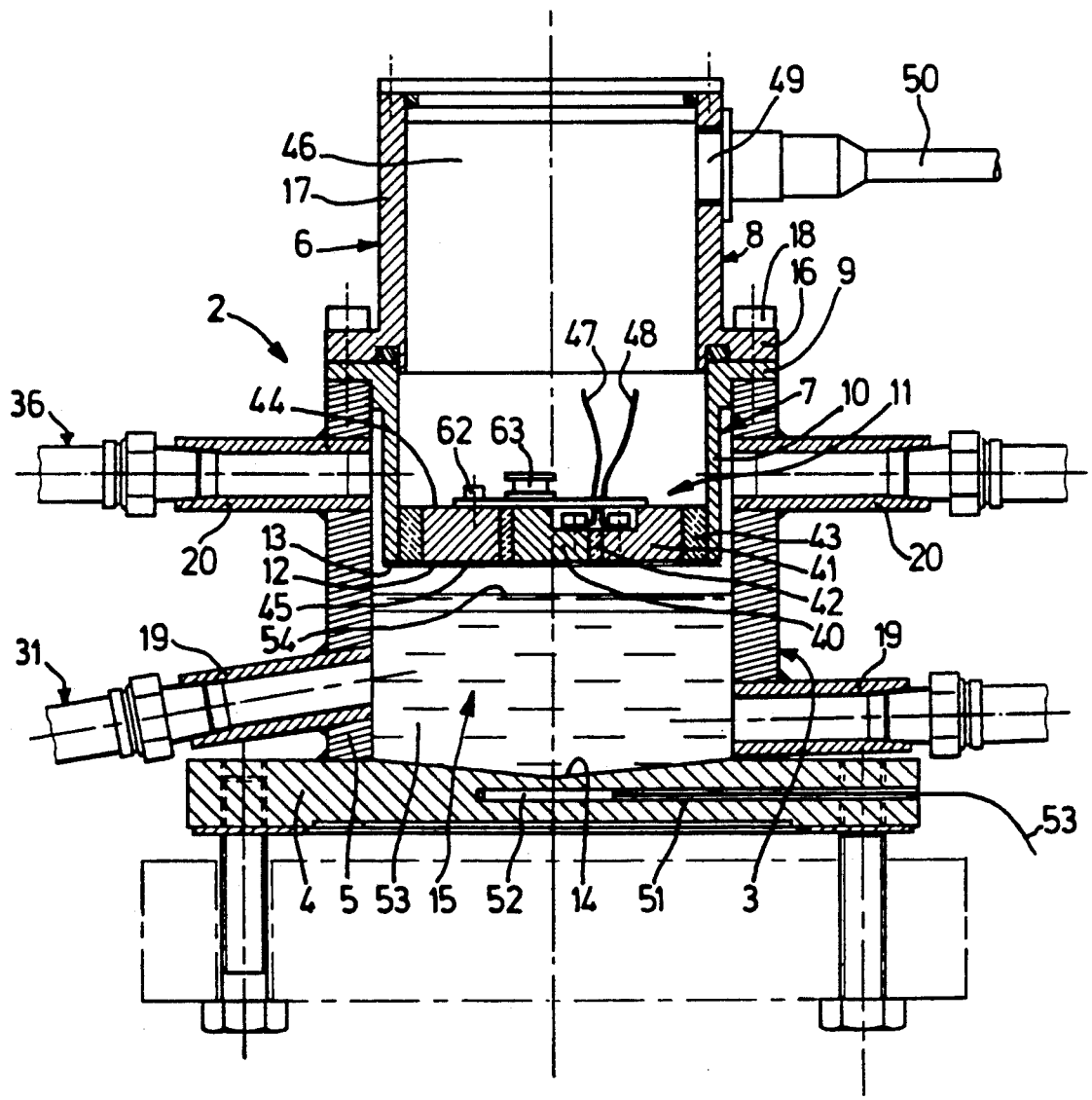
FIG. 2 shows a vertical section of a vessel of the device shown in FIG. 1; and and FIG. 3 shows diagrammatically an electronic signal-processing circuit associated with the abovementioned device.

Referring to FIG. 2, it is seen that the capacitive proximity sensor 11 comprises, concentrically to the cylindrical wall 5 of the body 3, a central electrode 40 consisting of a cylindrical block, another electrode in the form of an annular protective horn 41 whose inner and outer cylindrical surfaces are located respectively at a distance from the outer cylindrical surface of the central electrode 40 and from the inner cylindrical surface of the cylindrical portion 10 of the support 7, an annular electrical insulator 42 which fills the space separating the central electrode 40 and the annular protective horn 41, and an annular electrical insulator 43 which fills the space separating the annular protective horn 41 and the cylindrical portion 10 of the support 7.

The electrodes 40 and 41 and the electrical insulators 42 and 43 have, starting from the above-mentioned horizontal surface 12, equal thicknesses such that they extend between this lower horizontal surface 12 and an upper horizontal surface 44.

The central electrode 40 and the annular protective horn 41 are preferably made from a Fe-Ni alloy, with 42% Ni, and the electrical insulators 42 and 43 are preferably made from glass, these elements making up the capacitive sensor 11 preferably being sealed by means of a hot sealing process which guarantees leaktightness in their contact surfaces The lower surface 12 of the capacitive sensor 11 is covered with a thin anticorrosion layer 45. Similarly, the inner walls of the chamber 15 of the vessel 2 are also covered with a thin anticorrosion protective layer. These layers preferably consist of a tin-zinc covering.

The central electrode 40 and the annular protective horn 41 are connected, by means of two electrical leads 47 and 48, to a signal supply circuit 46 which is provided in the cover 8 which carries an electrical connector 49 for the connection of an electrical connection cable 50.

The base 4 of the body 3 has a recess 51 which emerges laterally and which extends at a short distance from the base 14 of the chamber 15. In this recess 51 is disposed a temperature probe 52 which is equipped with an electrical connection cable 53.

The device 1 which has just been described may be used and operates as follows.

Firstly, by using the auxiliary vessel 21, the circuit 31 is slowly filled with a liquid 53 which conducts electricity, preferably water containing an antimicrobial product such as bleach, until the level of water in the vessels 2a, 2b and 2c is located at a specific distance from the lower face 12 of their capacitive sensor 11. During this operation, the valve 37 is closed and the pump 39 is actuated, which causes the water in the liquid circuit 31 to circulate gently. As the liquid circuit 31 is filled through the action of communicating vessels, this pump 39 makes it possible to eliminate the air bubbles which could persist in the pipes 27, 28, 29 and 30 and which are discharged into the vessels.

When the desired level of water is reached, the circulation pump 39 is stopped and the valve 37 is opened.

After a stabilisation period, the vessels 2a, 2b, 2c and 21 being at atmospheric pressure via the tube 24, the vessels 2a, 2b and 2c are subjected to the same air pressure via the circuit 36 such that the upper surfaces 54 of the heads of water 53 set up in the vessels 2a, 2b, 2c and 21 extend in the same horizontal plane.

The result of this is that, in each vessel 2a, 2b and 2c, the distance between the lower face 12 of their capacitive sensor 11 and the upper surface 54 of the head of liquid they contain corresponds to the vertical position of the vessel and consequently to the vertical position of the point on which the latter is fixed relative to the horizontal plane in which the upper face of the liquid in the vessels extends. Thus, the signals provided by the capacitive sensor 11 of each of the vessels 2a, 2b and 2c, which corresponds to this distance, provide data relating to the position in the vertical direction of the vessel and consequently of the point on which it is fixed (i.e. sensor 11 outputs a signal corresponding to the dielectric formed only by the air between the lower face 12 and the upper surface of the liquid).

This distance between each of the points on which the vessels 2a, 2b and 2c are fixed and the above-mentioned horizontal plane depends also on the temperature of the body 3 and of the head of liquid contained in each vessel. The temperature probes 53 providing this temperature, it is then possible to correct the signals provided by the capacitive sensors 11 in order to obtain an accurate distance measurement.

It is appropriate to observe that, as the central electrode 40 is at a distance from the vertical inner surface of the wall 5 of the vessel and covers a zone of the surface 54 of the head of liquid, on the one hand this zone is perfectly planar and on the other hand any dust on the surface of the liquid does not influence the capacitive measurement. It is also possible to note that the capacitive measurement performed is independent of the meniscus effect and of vibrations. Moreover, since the body 3 has thick walls, its temperature and that of the liquid which it contains are equal to and unaffected by slow variations in the ambient temperature.

As may be seen in FIG. 2, the upper face of the capacitive sensor 11 is covered with a plate 62 made from an electrical insulator which is a good conductor of heat, on which is fixed a heat source consisting, for example, of a power transistor 63. This power transistor 63 makes it possible to heat up the elements 40, 41, 42 and 43 making up the capacitive sensor 11 in order to prevent the formation of condensation on its lower surface, which condensation would vary the capacitance and therefore would distort the measurements performed.

Referring to FIG. 3, a description will now be given of a possible mode of use of the signals provided by the capacitive sensors 11 and the temperature probes 52 of the vessels 2a, 2b and 2c on the basis of the diagram indicated generally by the reference 55.

It is assumed that it is desired to know the relative positions of the points on which the vessels 2b and 2c are fixed relative to the point on which the vessel 2a, which then constitutes a reference point, is fixed.

The distance signals provided by the capacitive sensor 11a of the vessel 2a are transmitted to a correction circuit 56 which also receives the signals from the temperature probe 52a of this vessel and which provides at its output a corrected signal of the distance between the capacitive sensor 11a and the upper surface of the liquid contained in this vessel.

Similarly, the capacitive sensors 11b and 11c and the temperature probes 52b and 52c are respectively connected to correction circuits 57 and 58 which provide, at their output, corrected signals corresponding to the distances between these capacitive sensors and the upper surface of the heads of liquid contained in these vessels.

The output signals of the correction circuits 56 and 57 are transmitted to an electronic comparison circuit 59 which provides, at its output, a signal corresponding to the algebraic difference between the relative positions of the points on which the vessels 2a and 2b are fixed.

Similarly, the output signals from the correction circuits 56 and 58 are transmitted to a comparison circuit 60 which provides, at its output, a signal corresponding to the algebraic difference between the relative vertical positions between the points on which the vessels 2a and 2c are fixed. The output signals of the comparison circuits 59 and 60 can then be transmitted to an interpretation circuit 61 adapted, for example, to provide, at its output, command signals or visualisation signals of the above mentioned differences.

To use the example of application mentioned above, these command signals may be intended for commanding jacks for adjustment in the vertical direction of the magnetic elements on which the vessels 2b and 2c are fixed, in order to displace the latter so as to dispose them suitably relative to the magnetic element on which the reference vessel 2a is fixed.

By virtue of the abovementioned arrangements of the device 1, it is possible continuously to control change of level of the points on which the vessels 2a, 2b and 2c are fixed and to achieve servocontrol of the adjustment of positions in the vertical direction of the magnetic elements. Of course, this servocontrol may be subject to conditions of deviation between the above-mentioned measured distances, to time conditions such that the liquid contained in the liquid circuit 31 is stabilized between each measurement or to conditions of maximum or minimum deviations between which it is possible to perform capacitive measurements of distance and, more particularly, to conditions of maximum deviations requiring an addition of liquid into the liquid circuit 31.

The present invention is not restricted to the example described above, many alternative embodiments being possible. In particular, the device according to the invention may be used not only to keep equipment in a horizontal plane or to measure variations in vertical position of equipment relative to a horizontal plane, but may also be applied to the measurement or the control of points located in different horizontal planes. To this end, it would suffice, for example, to place wedges underneath certain vessels Moreover, it goes without saying that the processing of the capacitive measurements performed could be carried out equally to perform the measurement corrections, the desired commands and the abovementioned monitoring procedures and measurement procedures of the device.

I claim:

1. A device for measuring or controlling a change of a level between several points, comprising:
   closed vessels placed respectively at each of said points, said vessels being partially filled with a liquid and being connected by liquid pipes at a lower portion to form a closed liquid circuit and connected by gas pipes at an upper portion to form a closed gas circuit;

a capacitive proximity sensor provided inside each closed vessel, each sensor has at least two electrodes which are spaced horizontally and concentrically, and a lower face of each electrode is placed above and at a distance from an upper surface of the liquid in the vessel and each sensor is adopted to provide a signal with respect to position in a vertical direction of a zone above the upper surface of the liquid in the vessel; and comparing means for comparing the signals provided by each said sensor to provide data with respect to the vertical position of each said vessel and about said points relative to one anther or relative to a reference vertical position.

2. A device according to claim 1, wherein said closed circuit is connected to a source of a gas at constant pressure.

3. A device according to claims 1 or 2, wherein the gas is air, the closed gas circuit being connected to the atmosphere.

4. A device according to claims 1 or 2, further comprising an auxiliary vessel inserted in the closed liquid circuit nd in the closed gas circuit, said auxiliary vessel being adopted for filling the liquid circuit.

5. A device according to claims 1 or 2, further comprising a pump which circulates the liquid in said closed liquid circuit.

6. A device according to claim 5, wherein said closed liquid circuit is equipped with a closure valve, said pump being mounted in a by-pass mode relative to said closure valve.

7. A device according to claims 1 or 2, wherein a body of each said closed vessel has a thick wall.

8. A device according to claims 1 or 2, wherein each closed vessel is equipped with a temperature probe which measures a temperature of the liquid.

9. A device according to claim 8, wherein the temperature probe is inserted into a body of the vessel and extends at a short distance from the liquid.

10. A device according to claims 1 or 2, wherein the liquid filling the closed liquid circuit is water containing an antibacterial substance.

11. A device according to claims 1 or 2, wherein said electrodes of said capacitive proximity sensor comprise a central electrode surrounded at a distance by an annular protective horn electrode, a first annular electrical insulator placed between the electrodes and connected to the electrodes in a leaktight manner together with a second annular electrical insulator extending around the annular protective horn electrode and connected in a leaktight manner to the annular protective horn electrode and to a body of the closed vessel, a lower radial face of said electrodes and of said first and second annular electrical insulators, which faces a surface of the liquid, being in a same horizontal plane.

12. A device according to claim 11, wherein said electrodes are made from an alloy or iron and nickel with 42% nickel.

13. A device according to claim 11, wherein said electrical insulators are made from glass.

14. A device according to claim 11, wherein the lower face of said capacitive proximity sensor is covered with a corrosion-resistant layer.

15. A device according to claim 14, wherein said corrosion-resistant layer is made from tin-zinc.

16. A device according to claims 1 or 2, wherein an inner wall of each said closed vessel is covered with a corrosion-resistant layer.

17. A device according to claim 16, wherein said corrosion-resistant layer is made from tin-zinc.

18. A device according to claims 1 or 2, wherein said capacitive proximity sensor is carried by a removable upper portion of said closed vessel.

19. A device according to claims 1 or 2, further comprising a means to heat the capacitive proximity sensor.

* * * * *